April 18, 1933.　　　P. DE ASIS　　　1,903,780
DISHWASHING MACHINE
Filed July 29, 1932　　　4 Sheets-Sheet 4
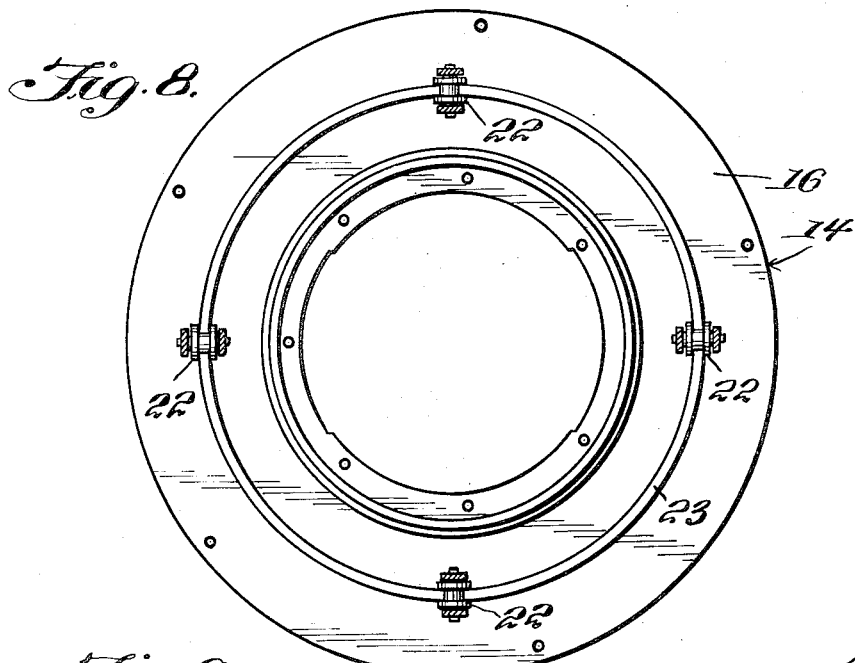
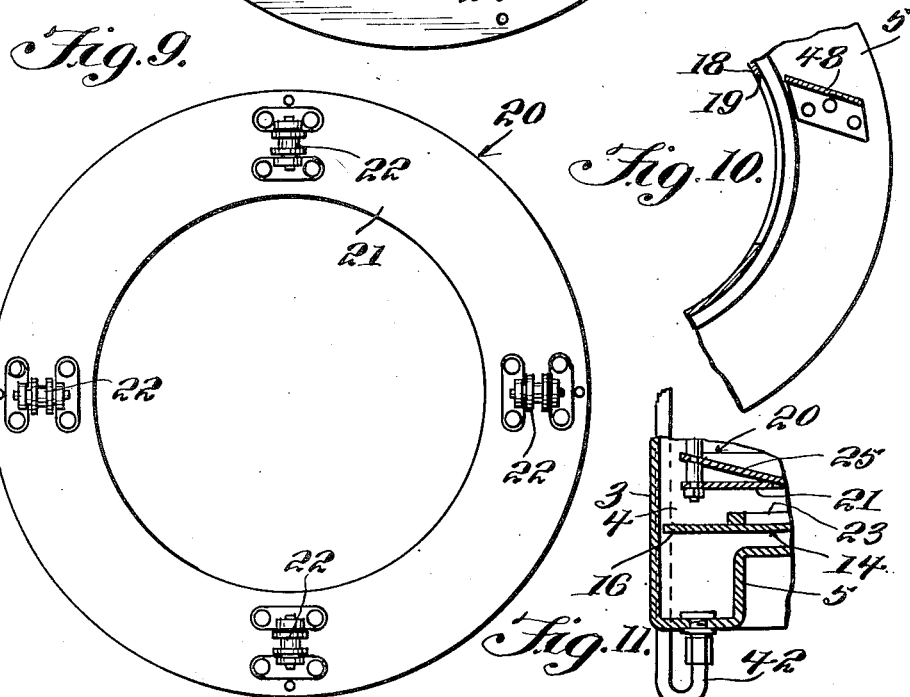
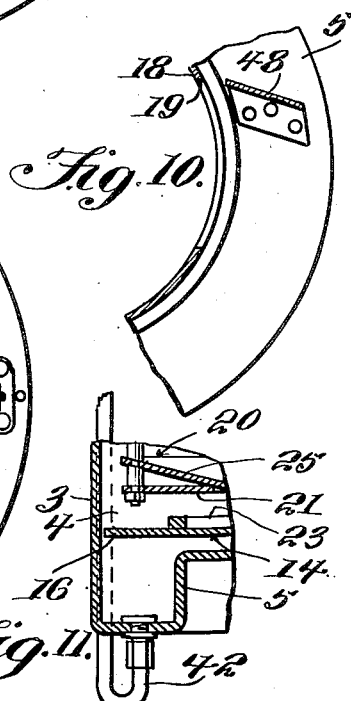
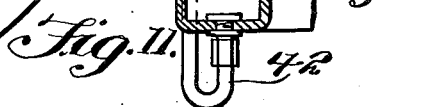

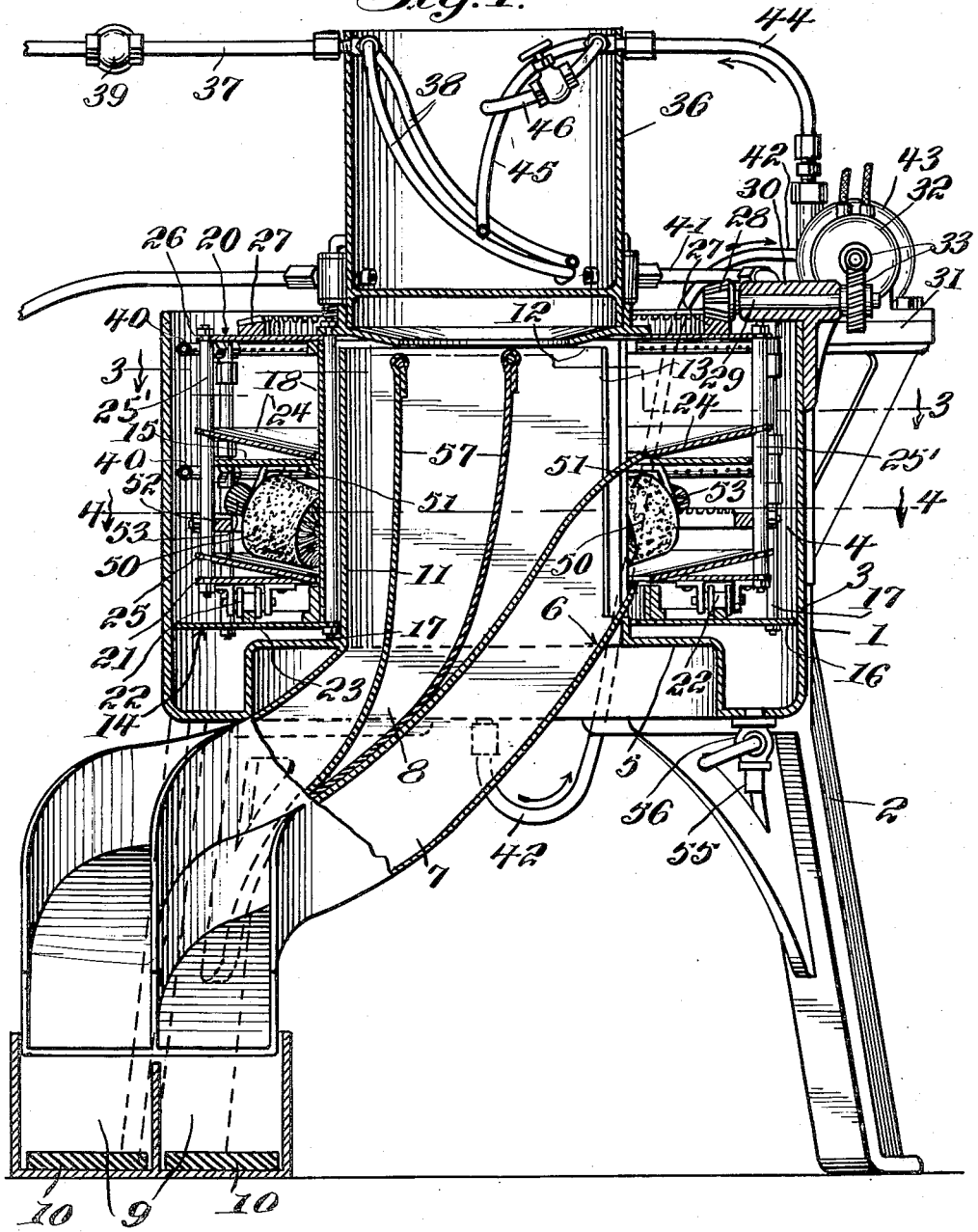

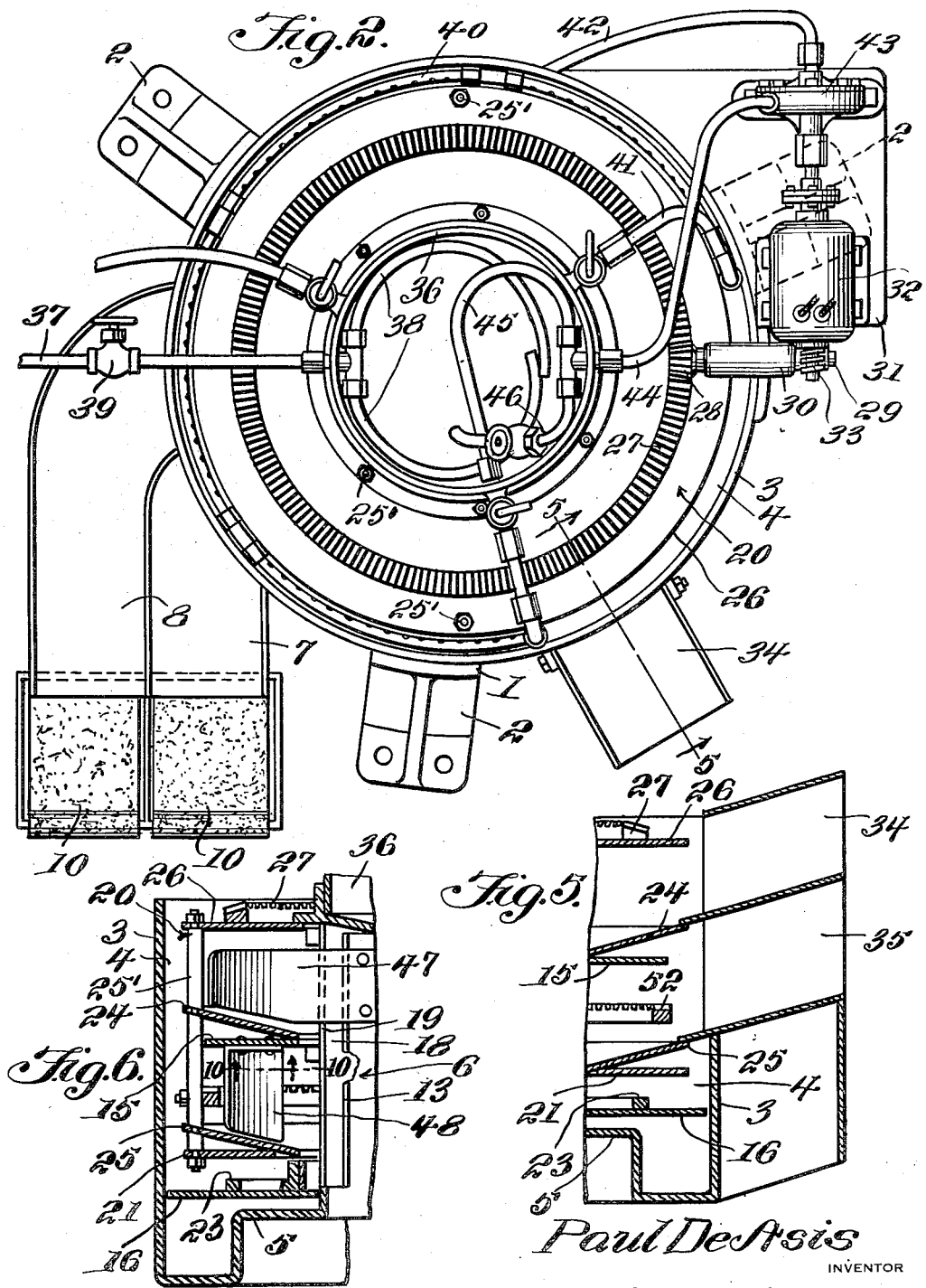

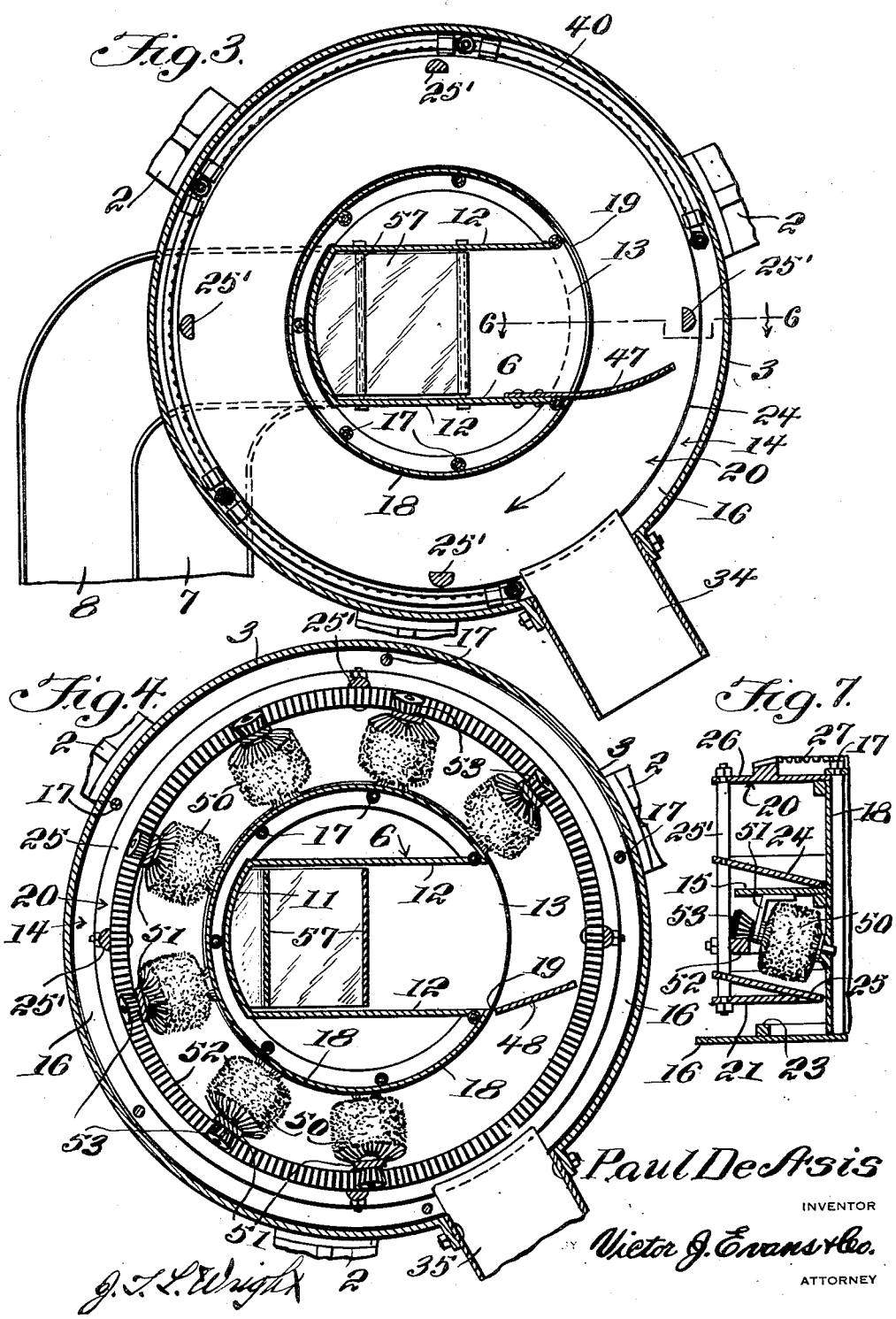

Patented Apr. 18, 1933

1,903,780

UNITED STATES PATENT OFFICE

PAUL DE ASIS, OF BURBANK, CALIFORNIA

DISHWASHING MACHINE

Application filed July 29, 1932. Serial No. 625,881.

This invention relates to dish washing machines and has for the primary object, the provision of a device of the above stated character whereby cups may be rapidly and efficiently washed as well as dishes and like tableware and delivered exteriorly of the device after washing without danger of breaking.

Another object of this invention is the provision of means for brushing or scrubbing the dishes while receiving a washing so as to remove therefrom any dirt or foodstuffs which may have dried or adhered thereto.

A further object of this invention is the provision of means for spraying dishes and cups with water from a supply either under pressure or by gravity to thoroughly remove foreign matter therefrom and said means returning the water to the supply.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a dishwashing machine constructed in accordance with my invention.

Figure 2 is a top plan view illustrating the same.

Figure 3 is a sectional view taken on the line 3—3 of Figure 1.

Figure 4 is a similar view taken on the line 4—4 of Figure 1.

Figure 5 is a fragmentary sectional view illustrating the hoppers for feeding cups and dishes separately into the washing chamber of the device.

Figure 6 is a fragmentary vertical sectional view showing means of deflecting the cups and dishes from the washing chamber into delivery chutes.

Figure 7 is a fragmentary vertical sectional view showing the means of mounting and operating brushes.

Figure 8 is a plan view partly in section illustrating a mounting for the dish carrying element.

Figure 9 is a bottom plan view of said dish carrying element.

Figure 10 is a fragmentary sectional view taken on the line 10—10 of Figure 6.

Figure 11 is a fragmentary sectional view illustrating the water return pipe connected to the washing chamber.

Referring in detail to the drawings, the numeral 1 indicates a support or stand including diverging legs 2 for firmly supporting the device on the support. The stand 1 carries a casing 3 having formed therein a washing chamber 4. The bottom wall of the casing is offset upwardly as shown at 5 and has formed integrally therewith a receiving end 6 of chutes 7 and 8. The chutes 7 and 8 extend substantially parallel with each other and gradually curve downwardly with their lower ends positioned in communication with receiving receptacles 9 in which cushions 10 are mounted. The receiving end 6 of the chutes 7 and 8 extends a considerable distance upwardly within the casing 3 and includes a curved wall 11 and straight side walls 12 forming therebetween a receiving space 13 in which the mouths of the chutes 7 and 8 are arranged one above the other as shown in Figure 1 and are communicative with the washing chamber 4 a considerable distance above the bottom thereof.

A supporting structure 14 is arranged within the casing 4 and suitably fixed to the casing. The supporting structure includes upper and lower plates or disks 15 and 16 connected by tie rods 17. A semi-cylindrical sleeve 18 is carried by the upper and lower plates 15 and 16 of the supporting structure and surrounds the receiving end or portion 6 of the chutes and is provided with an opening 19 aligning with the mouths of the chutes.

A revolvable dish and cup supporting structure 20 is located within the supporting structure 14 and includes a lower disk or plate 21 carrying grooved rollers 22 mounted on an annular track 23 carried by the plate 16 of the supporting structure 14. Substantially conical shaped upper and lower supporting plates 24 and 25 are included in the revolvable dish and cup supporting structure 20. The disk or plate 24 at its inner edge aligns with the mouth of the chute 8 while the inner edge of the disk or plate 25 aligns with the mouth of the chute 7. Tie rods 25' connect the upper and lower plates or disks 25 and also are connected to an upper plate 26 to which is secured a ring gear 27 meshing with a pinion 28 secured to a shaft 29 journalled in a bearing 30 carried by the casing 3. A bracket 31 is carried by the casing 3 and supports an electric motor 32 connected to the shaft 29 by gearing 33 whereby the cup and dish supporting structure 20 is revolved by the rotation of the electric motor.

Receiving hoppers 34 and 35 are carried by the casing 3 with their discharge ends slightly disposed over the plates or disks 24 and 25. Cups and the like are fed onto the plate 24 by way of the hopper 34 while dishes are fed onto the plate 25 by way of the hopper 35.

A supply tank 36 is mounted on the supporting structure 14 and extends above the casing 3 and is adapted to be filled with water or other washing fluid from a main 37 having branch pipes 38 which extend downwardly in opposite directions within the supply tank and exhaust adjacent the bottom of said tank. A control valve 39 is arranged in the supply main 37. Spaced semi-circular spray tubes 40 are mounted within the washing chamber about the supporting structure 14 and are connected to the supply tank 36 by a pipe 41 having a control valve. The bottom of the washing chamber has connected thereto a return pipe 42 leading to a pump 43 driven by the motor 32 and the outlet end of the pump is connected to a pipe 44 extending into the supply tank 36 and provided with branch pipes 45 and 46. The branch pipe 46 is provided with a control valve and exhausts into the supply tank while the pipe 45 is connected to the spray tubes 40 and provided with a control valve. When the valve in pipe 46 is opened the liquid from the bottom of the chamber 4 may be drained upwardly by the pump and exhausted into the supply tank, the liquid in the supply tank passing into spray tubes by way of the pipe 41 when the control valve thereof is opened. During this time it is to be understood that the motor 32 is in operation driving the structure 20 as well as the pump. As the dishes and cups are carried in a circular path from the hoppers 34 and 35 they are sprayed with liquid from the tubes 40. A check 47 is carried by the portion 6 and extends through the opening 19 of the sleeve 18 over the plate or disk 24 to be engaged by the cups causing said cups to move into the trough 8 and descend into the collecting receptacle 9 thereof. A check 48 is carried by a plate 15 of the supporting structure 14 and is arranged in the path of movement of the dishes for deflecting the dishes off the plate or disk 25 into the chute 7 so that they may gravitate into the collecting receptacle 9 therefor.

A series of brushes 50 are arranged slightly above the plate or disk 25 on which the dishes are carried while being washed and are rotatably supported by brackets 51 carried by the structure 14. The brushes are connected to a stationary ring gear 52 by pinions 53 and said ring gear is carried by the supporting structure 20 so that during the revolving of the structure 20 the brushes will be rotated. The brushes rotating and in engagement with the dishes carried by the plate or disk 25 will remove from the dishes foreign matter that may have adhered thereto.

The washing chamber 4 is provided with a drain pipe 55 having a control valve 56 whereby the chamber may be emptied of any liquid and foreign matter when desired.

A receiving portion 8 of the chutes has suspended therein strips 57 of flexible material engaging in the chute 8 for the purpose of retarding the gravitation of cups through the chute 8 which eliminates the possibility of the cups passing through the chute 8 rapidly and subjecting them to breakage.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A dish washing machine comprising a casing having a washing chamber, a revolving supporting structure in said chamber to rotate about a vertical axis, a power means for rotating the supporting structure, upper and lower plates carried by the supporting structure, means for delivering cups to the upper plate, means for delivering plates to the lower plate, delivery chutes communicative with said upper and lower plates, means for deflecting the cups and dishes from their respective plates into said chutes, and means for spraying the cups and dishes while carried by the plates.

2. A dish washing machine comprising a casing having a washing chamber, a revolving supporting structure in said chamber to rotate about a vertical axis, a power means for rotating the supporting structure, upper and lower plates carried by the supporting structure, means for delivering cups to the upper plate, means for delivering plates to the lower plate, delivery chutes communicative with said upper and lower plates, means for deflecting the cups and dishes from their respective plates into said chutes, a supply tank carried by the casing above said washing chamber and adapted to be filled with a washing fluid, spray means in the washing chamber and in communication with the supply tank for directing the fluid onto the cups and dishes while carried by the plates, and a pump means operated by the power means to return the liquid from the washing chamber to the supply tank.

3. A dish washing machine comprising a casing having a washing chamber, a revolving supporting structure in said chamber to rotate about a vertical axis, a power means for rotating the supporting structure, upper and lower plates carried by the supporting structure, means for delivering cups to the upper plate, means for delivering plates to the lower plate, delivery chutes communicative with said upper and lower plates, means for deflecting the cups and dishes from their respective plates into said chutes, a supply tank carried by the casing above the washing chamber and adapted to be filled with a washing fluid, spray means in the washing chamber and in communication with the supply tank for directing the fluid onto the cups and dishes while carried by the plates, a pump means operated by the power means to return the liquid from the washing chamber to the supply tank, and means whereby said pump means may force the liquid into the spray means under pressure.

4. A dish washing machine comprising a casing having a washing chamber, a revolving supporting structure in said chamber, cup and dish supporting plates carried by said supporting structure, means for feeding cups and dishes onto said plates, delivery means receiving the cups and dishes from said plates after a given movement with said plates, means for spraying the cups and dishes while carried by said plates with a cleaning fluid, power means for rotating the supporting structure, brushes rotatably carried by the casing to engage the dishes when on the supporting structure, a ring gear fixed to the supporting structure, and gears connecting the brushes to the ring gear to cause rotation of said brushes during the rotation of the supporting structure.

In testimony whereof I affix my signature.

PAUL DE ASIS.